Nov. 30, 1954
R. HUBER
2,695,497
VEHICLE HAVING SEVERAL AXLES OR GROUPS OF
AXLES DRIVEN BY GAS TURBINES RESPECTIVELY
Filed July 3, 1950
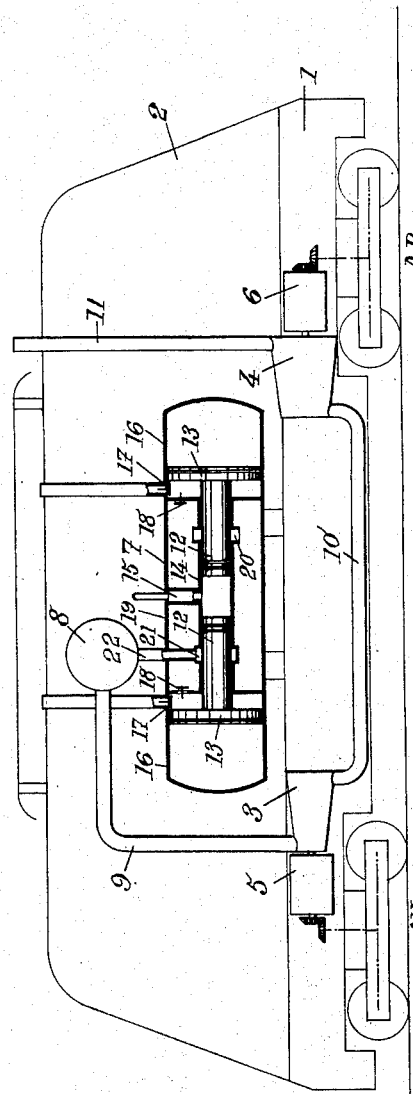
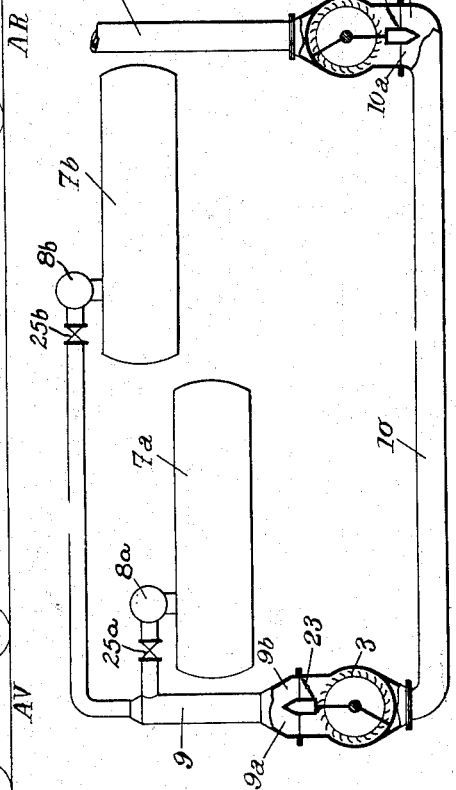
INVENTOR
Robert Huber
BY
Bailey, Stephens & Huettig
ATTORNEYS

United States Patent Office 2,695,497
Patented Nov. 30, 1954

2,695,497

VEHICLE HAVING SEVERAL AXLES OR GROUPS OF AXLES DRIVEN BY GAS TURBINES RESPECTIVELY

Robert Huber, Bellevue, France, assignor to Société d'Etudes et de Participations Eau, Gaz, Electricité, Energie, S. A., Geneva, Switzerland, a society of Switzerland Application July 3, 1950, Serial No. 171,991

Claims priority, application France July 16, 1949

1 Claim. (Cl. 60—39.16)

The present invention relates to vehicles having several axles or groups of axles driven by respective gas turbines.

It is more especially but not exclusively concerned with vehicles of this kind provided with one or several auto-generators, preferably of the free piston type, for supplying the gas turbines with power gas.

Its chief object is to provide a vehicle of this kind which is better adapted to meet the requirements of practice than those existing at the present time.

According to my invention, every axle or group of axles is driven by a distinct turbine and these turbines are connected in series with respect to the gaseous stream that flows therethrough, so as to pass through each of these turbines substantially the same gases which expand in several stages, successively, each of these turbines preferably having substantially the same power.

Preferred embodiments of my invention will be hereinafter described with reference to the accompanying drawing, given merely by way of example and in which:

Fig. 1 diagrammatically shows in axial section a locomotive made according to my invention;

Fig. 2 is a diagrammatic plan view of a power plant for a vehicle made according to my invention, the power gases of the turbines being supplied by two auto-generators which may be brought into or out of service independently of each other.

My invention, as hereinafter described, will be supposed to be applied, for instance to a locomotive having several axles divided into two groups each of which is mounted on a truck and is driven by a gas turbine fed with power gases from free piston auto-generators.

The locomotive includes a frame 1 on which the body 2 is mounted and which is supported on four axles, each with two wheels, divided into two groups of two axles mounted respectively on a front truck AV and a rear truck AR.

The wheels of each truck are driven by a gas turbine designated respectively by 3 and 4, with the interposition between each turbine and the corresponding wheels of a speed reducing gear 5, 6 and also of the necessary transmission means, such as bevel gear, etc.

These gas turbines are supplied with power gases preferably delivered by a free piston auto-generator 7. In such a locomotive, the power plant is called upon to supply, at least on starting, a very high torque, which requires a relatively high number of stages. On the other hand, in order to obtain a good efficiency of the turbines, the maximum possible amount of gas is to be passed therethrough.

In order to comply with these conditions, according to my invention, gas turbines 3 and 4 are mounted in series on the stream of power gases. The gases supplied by said auto-generator and received in reservoir 8 are fed through conduit 9 to the intake of one of the two turbines, for instance the intake of turbine 3, where they partly expand. Then the gases, leaving turbine 3, which thus constitutes the high pressure turbine, are conveyed, through a conduit 10, to the intake turbine 4, where they finish expanding, this last mentioned turbine thus constituting the low pressure turbine.

Finally, the gases leaving turbine 4 escape to the atmosphere through conduit 11.

Thus the gases are caused to expand gradually in a relatively high number of stages, to wit the sum of the stages of turbines 3 and 4 and each of these two turbines receives the whole of the gases supplied by auto-generator 7. Preferably, the pressure drop in each of the turbines 3 and 4 is made such that the two turbines have substantially the same power.

Free piston auto-generator 7 may of course be arranged in any suitable manner. It is only by way of example that it is shown by Fig. 1, as an auto-generator having two opposed movable units including each a power piston 12 and a compressor piston 13. Both of the power pistons 12 reciprocate in a power cylinder 14, working for instance on the two-stroke cycle, and into which fuel is injected through an injector 15. Compressor pistons 13 divide their respective cylinders each into two chambers, the inner one of which, forming the compressor chamber proper, is fitted with inlet valve 17 and outlet valve 18, whereas the outer compartment of each cylinder 16 constitutes a return pneumatic energy accumulator. The air compressed by the compressor pistons in the inner chamber of cylinder 16 is discharged at the end of the inward stroke, through valves 18, into the casing 19 of the machine, which surrounds power cylinder 14. Near the end of the outward stroke of the movable units, these units open the intake ports 20 and the exhaust ports 21 of the power cylinder. When these ports are opened, air under pressure present in casing 19 enters power cylinder 14, for scavenging this cylinder supplying it with the necessary air. The excess of scavenging air together with the combustion gases, which have incompletely expanded, escape through pipe 22 into reservoir 8 whence they are fed as power gases to turbines 3 and 4.

When the vehicle includes several, for instance two, auto-generators capable of being independently brought into and out of action, it is a useful thing to divide the first guide nozzle ring of each of the turbines into two sectors fed through two distinct supply conduits. For instance the feed conduits 9a and 9b of the two sectors of the first nozzle ring of high pressure turbine 3 are connected with the main feed conduit 9 into which the respective reservoirs 8a and 8b of the two generators 7a and 7b deliver their output gases when the corresponding cut-off valves 25a and 25b are open, and the feed conduits 10a and 10b of the two sectors of the first nozzle ring of low pressure turbine 4 being connected with the intermediate main conduit 10 which conveys to the low pressure turbine the gases that have already expanded in the high pressure turbine (Fig. 2).

Furthermore, I provide a valve in at least one of the two intake conduits 9a, 9b, and 10a, 10b of each turbine, for instance in conduits 9b and 10b, the valve provided in conduit 9a being designated by 23 and that provided in conduit 10b being designated by 24. When both of the auto-generators 7a and 7b are simultaneously delivering power gases (i. e. valves 25a and 25b are both open), stopping members 23 and 24 are in the open position and the two sectors of the first nozzle ring of each turbine are supplied with gases, whereby this nozzle ring is supplied with power gas over its whole circumference. On the contrary, if one of the two auto-generators is stopped, valves 23 and 24 are closed so that only one of the sectors of the first nozzle ring of each turbine is supplied with power gas through feed conduit 9a, 10a, constantly open.

In order that, in this last mentioned case, the powers of the two respective turbines 3 and 4 may remain substantially equal, the nozzle ring sector which is supplied through conduit 9a, 10a respectively, extends advantageously over an angle smaller than 180°, as shown by Fig. 2.

Of course the vehicle, instead of a locomotive, may be a rail motor car, a tank or any other vehicle having several axles which drive wheels or caterpillars.

There may be any number of turbines mounted in series, for instance three, four or more.

As for the device which supplies power gas to the turbines, it might be a semi-free piston auto-generator or a fixed stroke piston auto-generator, including a crank shaft and connecting rods. It might also be a motor-compressor, the power fluid being, in this case, not a mixture of air and gas, as in auto-generators, but pure compressed air.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claim.

What I claim is:

In combination, two gas turbines having independent shafts, each of these turbines including a guide nozzle ring divided in two sectors, a gas intake conduit leading to each of these sectors respectively and valve means for controlling one of said intake conduits, a first main conduit opening into both of the intake conduits of one of said turbines, two power gas generators, means for connecting the outlet of each of said gas generators with said main conduit, valve means on said connecting means, a main intermediate conduit connecting the outlet of said last mentioned turbine with both of the intake conduits of the other turbine, and a discharge conduit mounted on the outlet of said last mentioned turbine.

References Cited in the file of this patent

UNITED STATES PATENTS

| Number | Name | Date |
|---|---|---|
| 1,534,275 | Leathers | Apr. 21, 1925 |
| 1,807,485 | MacLeod | May 26, 1931 |
| 1,816,737 | Moss | July 28, 1931 |
| 1,816,787 | Moss | July 28, 1931 |
| 1,856,024 | Büchi | Apr. 26, 1932 |
| 2,098,074 | Warren | Nov. 2, 1937 |
| 2,237,082 | Pateras Pescara | Apr. 1, 1941 |
| 2,355,177 | Pateras Pescara | Aug. 8, 1944 |
| 2,415,110 | Pateras Pescara | Feb. 4, 1947 |
| 2,469,238 | Newton | May 3, 1949 |
| 2,539,471 | Ramsey | Jan. 30, 1951 |